Dec. 7, 1926.  1,610,065
J. E. MEYER
VEHICLE BODY
Filed April 7, 1923  3 Sheets-Sheet 1
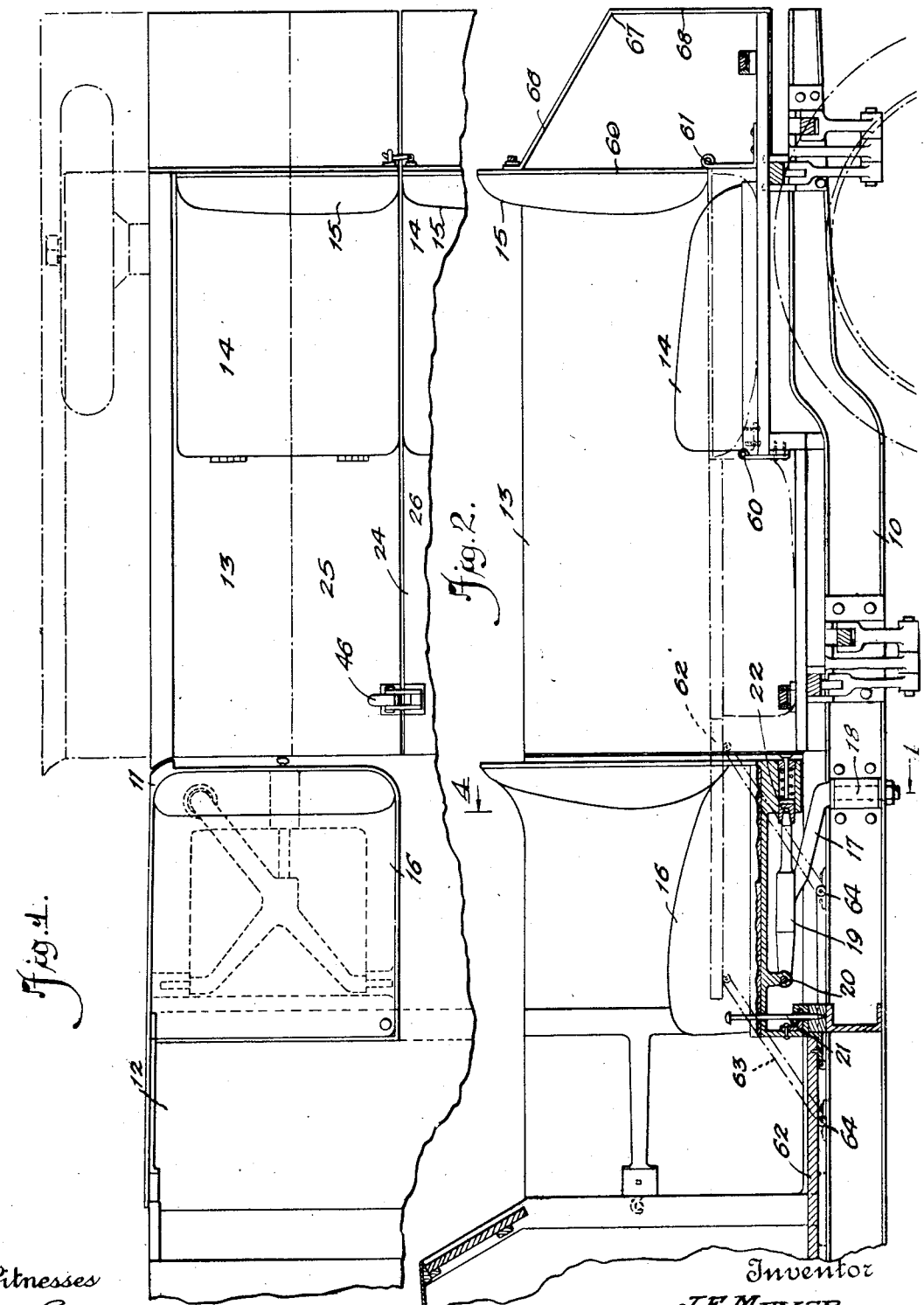

Dec. 7, 1926.  J. E. MEYER  1,610,065
VEHICLE BODY
Filed April 7, 1923   3 Sheets-Sheet 2

WITNESSES

INVENTOR
J. E. MEYER
BY
ATTORNEYS

Dec. 7, 1926.   J. E. MEYER   1,610,065
VEHICLE BODY
Filed April 7, 1923   3 Sheets-Sheet 3
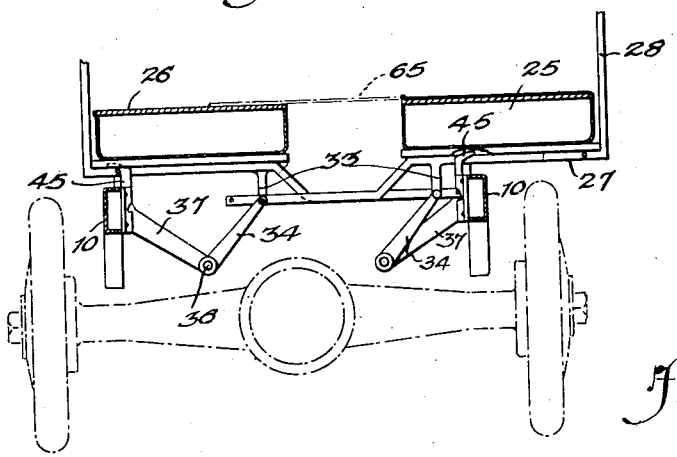
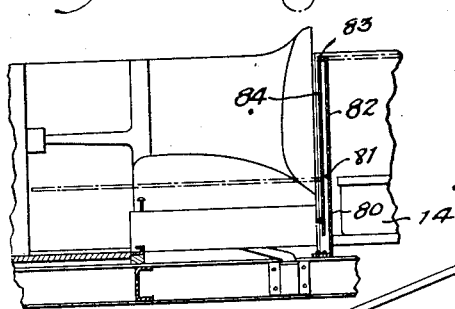
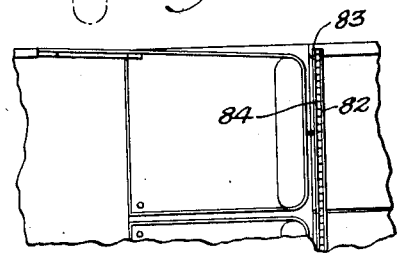
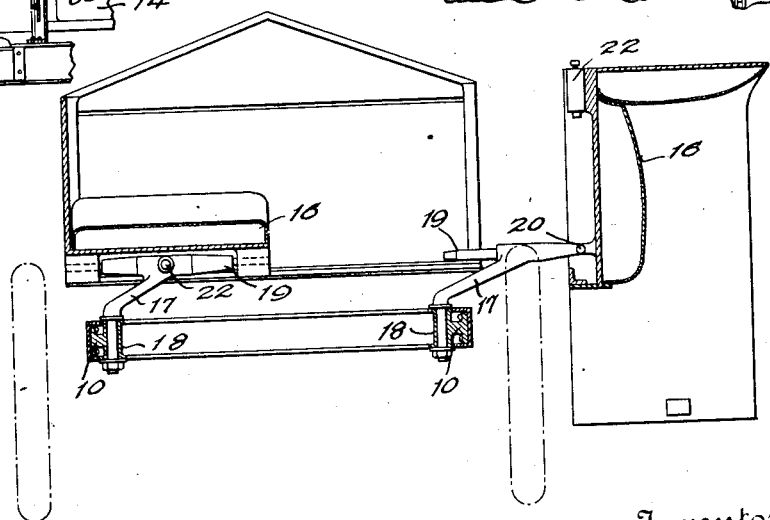
Witnesses
Inventor
J. E. MEYER
By Attorney Patented Dec. 7, 1926.

1,610,065

UNITED STATES PATENT OFFICE.

JOHN ERNEST MEYER, OF NEW YORK, N. Y.

VEHICLE BODY.

Application filed April 7, 1923. Serial No. 630,515.

The present invention relates to new and useful improvements in vehicles, and it pertains more particularly to a body construction therefor.

It is one of the primary objects of the invention to construct a vehicle body in such a manner that the several parts thereof may be positioned to provide a bed for sleeping purposes.

It is a further object of the invention to construct the body in such a manner that when the bed is formed the latter will have sufficient length to permit of a person or persons reclining in full extended position.

It is a further object of the invention to construct the vehicle body in such a manner that the driving compartment of the body and the tonneau compartment thereof while normally two separate compartments, may be thrown together to provide a single compartment.

It is a still further object of the invention to construct the vehicle body in such a manner that the same may be laterally extended in order to give sufficient width to the sleeping compartment.

With the above and other objects in view, reference is had to the accompanying drawings, in which—

Figure 1 is a top plan view partly broken away, of an automobile body constructed in accordance with the present invention;

Fig. 2 is a view in side elevation and partly in section of the automobile body;

Fig. 3 is a transverse sectional view showing one side of the vehicle body in extended position;

Fig. 4 is a vertical sectional view taken on the line 4—4 of Fig. 2;

Fig. 7 is a detail sectional view showing a form of the invention wherein the tonneau compartment has a front wall as distinguished from the preferred form of the invention in which the front wall is omitted;

Fig. 8 is a detail top plan view of the construction shown in Fig. 7.

Figure 5:
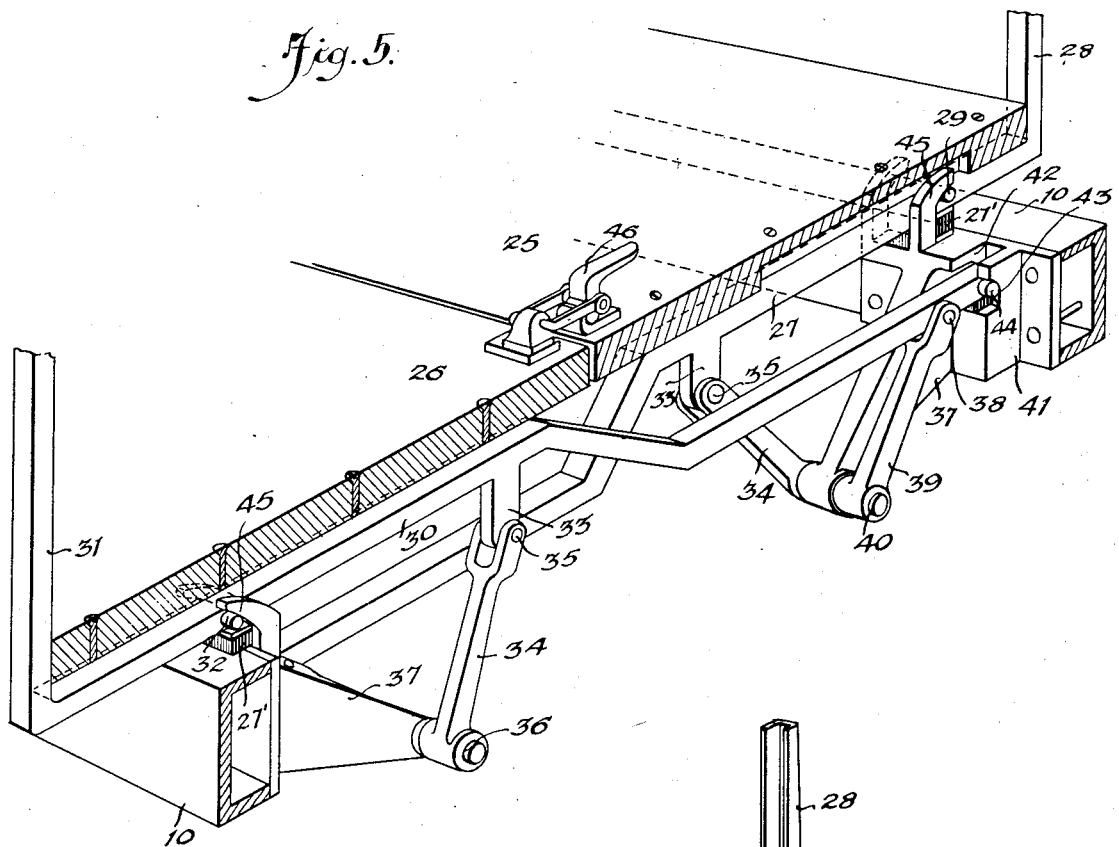
Fig. 5 is a perspective view partly in section, taken transversely of the body and showing the guiding and locking mechanism of the laterally sliding sections.

Referring more particularly to the drawings, the reference character 10 designates the side frames of the vehicle chassis, such side frames being preferably of the conventional channel construction. Mounted upon the chassis is the body 11 of the vehicle, and said body has a driving compartment 12 and a tonneau compartment 13.

Mounted in the tonneau compartment 13 are two seats 14, each of which has a back 15. Mounted in the driving compartment are two seats 16. Each of the seats 16 is carried by an arm 17 mounted in a bracket 18 as described in an application filed by me April 5, 1923, Serial No. 630,114. Carried by the arm 17 is an arm 19, and the seat 16 is pivotally mounted as at 20 upon the arm 19. Carried by the front of the seat 16 is a latch member 21, in the form of a sliding bolt, which when released is adapted to permit of the seat 16 swinging in the bracket 18, and carried by the rear of the seat frame is a latch member 22, which when in released position permits of the seat swinging about the pivot 20. It is understood that each of the front seats is constructed in the manner heretofore described.

The floor of the tonneau compartment is divided longitudinally as at 24, into two sections 25 and 26, and said sections are capable of movement laterally of the chassis of the vehicle. As more clearly shown in Fig. 5, the section 25 is mounted on a transversely extending support 27, which has a right-angular extension 28 on its outer end. This transversely extending support 27 is adapted to rest on a pad, or the like, 27', and such pad is preferably formed of rubber in order that the transversely extending support 27 will not contact with the side frames 10 of the chassis. The support 27 is provided with a pin 29, the purpose of which will be hereinafter described. The section 26 of the tonneau floor is mounted in a suitable support 30, and said support 30 has a right-angular extension 31 on its outer end. It will also be noted that this support 30 rests on a cushion pad 27', and is likewise provided with a pin 32, the purpose of which will be hereinafter described.

Each of the supports 27 and 30 is provided with a depending lug 33, and pivotally connected to each depending lug is a lever 34. Each lever is pivotally connected to its respective lug as at 35, and at its other end said lever 34 is pivotally connected as at 36, to a bracket 37 rigidly carried by the side frames 10 of the chassis. Each of these supports 27 and 30 is further connected as at 38, to a lever 39, which lever is likewise pivotally connected as at 40, to the pivotal connection 36 of the lever 34 heretofore mentioned.

Carried by each of the side frames 10 of the chassis, is a housing 41, which has a cut-out portion 42 to receive the end of its respective support 27 or 30, and the side walls of the cut-out portions 42 are notched as at 43 to receive a pin 44 carried by its respective support. This pin 44 engaging beneath the upper wall of the notched portion 43 prevents the end of its respective support from disengagement with the cut-out portion 42 of its respective housing 41. Each of the housings 41 is provided with a pair of spaced lugs or fingers 45 through which the supports work. These fingers or lugs are adapted to engage their respective pin, 29 or 32, when the sections of the tonneau flooring are in closed relation. In order to hold the sections of the tonneau flooring in closed relation, the latch members 46 are employed.

Figure 6:
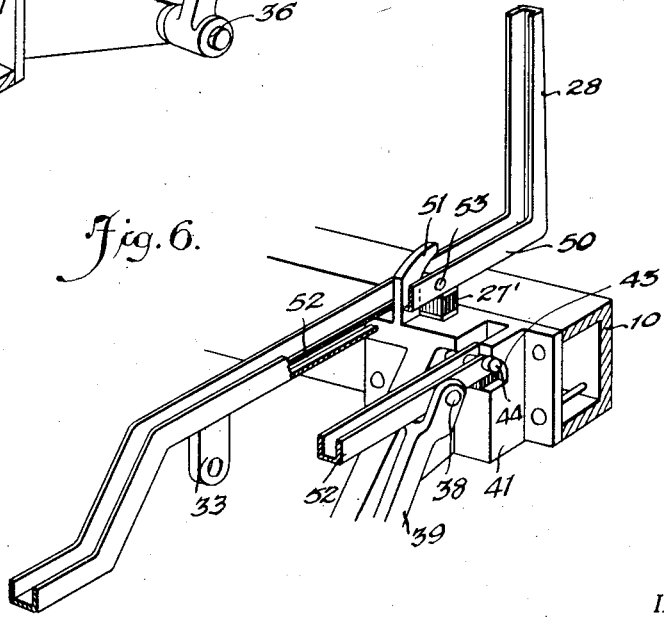
Fig. 6 is a detail perspective view partly in section, of a slightly modified form of the invention.

In Fig. 6 a slightly modified form of the invention is shown, and in this form, the supports 50 are in the form of channel irons and in lieu of employing a pair of spaced lugs or fingers 45, a single lug or finger 51 is employed, which projects through a slot 52 in the base or web of the channel iron. For engagement beneath these lugs or fingers 51, pins 53 are employed, which pins 53 are supported in the side flanges of the channel member by which they are carried. Except for this form of lock, the remainder of the construction is preferably the same as that described in the preferred form of the invention.

When the two members 25 and 26 are brought together and the latches 46 operated to retain the members 25 and 26 in their innermost position, it will be seen that by the pins 29 and 32 riding down the inclined face of their respective lug 45, the transversely extending supports 27 and 30 will serve to compress their respective pads 27', thus forming a tight connection between the pins 29 and 32 and their respective fingers 45 and preventing rattling of the parts.

The body constructed in accordance with the present invention operates in the following manner:

When it is desired to throw the driving compartment and tonneau compartment together for the purpose of providing sleeping space, the rear seat members are thrown forwardly onto the floor of the tonneau compartment, said seat members being hinged to their support, as at 60, to permit of this operation. After this has been accomplished, the backs 15 of the rear seats are swung downwardly on to the seat frame, said backs 15 being hinged as at 61, to permit of this action. Each of the front seats is now turned about its vertical pivot in the bracket 18 by releasing the latch member 21. Upon swinging the front seats about their vertical pivots, each will swing outwardly of the car. After each of the seats has been swung outwardly of the car, the latch member 22 is released and the seats are swung about their horizontal pivots to the positions shown in Fig. 4, where they will be entirely outside of the confines of the body, leaving the driving compartment of the car free and unobstructed.

After the front seats have been swung outwardly of the car as above described, the front floor board 62 is swung up to the dotted line position shown in Fig. 2, where its upper face will be flush with the upper surface of the rear seats and their backs when in the folded position heretofore described. To permit of the front floor board swinging to this position, the same is carried upon levers 63, which levers are pivotally connected as at 64, to the side frames 10 of the chassis. After the foregoing operation has been carried out, the two sections 25 and 26 of the tonneau compartment are moved laterally of the car body to the position in which one of them is shown in Fig. 3, and the space between these two sections is closed by a flap 65, which is connected to the sections of the tonneau compartment. After the body has been thus positioned, mattresses or other suitable pads are placed upon the seats and the back of the tonneau compartment and the floor board 62 of the driving compartment, and a bed is provided. When the body is extended laterally as heretofore described, it is obvious that there will be a space between the members at the rear of the tonneau section. This space, however, is closed by means of a curtain or the like, which is secured across the space in any desired manner. The rear of the body exterior of the tonneau compartment is provided with a downwardly inclined wall 66, terminating as at 67, and connected to the vertical wall 68 spaced from the rear wall 69 of the tonneau compartment. This construction provides suitable storage space for the pads or bedding employed in making the bed when the body is extended as heretofore described.

In that form of the invention shown in Figs. 7 and 8, the shifting floor board is eliminated and a short vertical wall 80 projecting from the floor of the tonneau compartment and at the front thereof is employed. Pivotally connected as at 81 to this short wall section, is a hinged wall section 82, and hingedly connected to said hinged wall section, as at 83, is another hinged wall section 84. When it is desired to convert the body into a bed, the seats are swung outwardly as in the aforementioned form of the invention, and the elements 82 and 84 are straightened outwardly into the driver's compartment, as shown by dotted lines in Fig. 7, to form a continuation of the folded-down seat bottom 14 and provide a flush surface for carrying the mattress.

From the foregoing it is apparent that the present invention provides means whereby a vehicle body may be transformed from a conventional type of touring car to a sleeping car by slight changes and modifications in the construction of the body. Furthermore, the invention provides a body which may be extended laterally to give ample breadth and length to the sleeping compartment.

What is claimed is:

1. In a vehicle body, a main body portion divided into a driving compartment and a tonneau compartment, a plurality of hinged seats in the tonneau compartment adapted to swing to position on the floor of the tonneau compartment, and a floor board in the driving compartment adapted to move in the direction of the tonneau compartment and occupy a position flush with the top surface of the seats when the latter are moved to position on the floor of the tonneau compartment.

2. In a vehicle body, a main body portion divided into a driving compartment and a tonneau compartment, seats carried in the tonneau compartment and pivotally mounted to swing to the floor of said compartment, backs for said seats, said backs being hinged and adapted to swing to position on the seat frames when the seats are moved to position upon the floor, seats in the driving compartment adapted to be swung outwardly of the body, and a pivotally mounted floor board in the driving compartment adapted to swing upwardly to a position flush with the seats and the seat backs when the seats are in position on the floor of the tonneau compartment and the backs are in position upon the seat frames.

3. A vehicle body comprising a main body portion divided into a tonneau compartment and a driving compartment, said tonneau compartment being divided longitudinally to permit of lateral movement of the sections of the tonneau compartment in opposite directions, transversely extending supports for said tonneau sections, resilient pads carried by the side frames of the vehicle chassis for supporting said transversely extending supports, and means for placing said resilient pads under compression when the sections of the tonneau compartment are in their innermost position.

4. A vehicle body comprising a main body portion divided into a driving compartment and a tonneau compartment, forwardly swinging seats in the tonneau compartment mounted to swing forwardly with their backs in a horizontal plane, outwardly swinging seats in the driver's compartment, and a floor for the driving compartment, said floor being mounted to swing upwardly and rearwardly when the seats in the driving compartment are swung outwardly, said floor moving to a position flush with the tonneau seats when the same are swung forwardly.

5. In a vehicle, a frame, floor sections, and means for movably supporting said floor sections, said means being operable to shift the floor sections to a floor-forming relationship and operable to shift said floor sections to supporting positions respectively at opposite sides of the frame, said means including slidably mounted supports, each having attached thereto one of said floor sections, said supports being slidable in opposite directions, and a jointed connection between each support and said frame.

JOHN ERNEST MEYER.